(12) United States Patent
Kajisawa et al.

(10) Patent No.: US 12,240,339 B2
(45) Date of Patent: Mar. 4, 2025

(54) POWER SUPPLY DEVICE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Yuuta Kajisawa, Okazaki (JP); Yuji Fujita, Okazaki (JP); Yugo Nagashima, Anjo (JP); Kazuma Hasegawa, Anjo (JP); Takashi Koudai, Okazaki (JP); Masaharu Yamashita, Toyota (JP); Atsushi Satou, Miyoshi (JP); Yosuke Yamashita, Nagoya (JP); Kazuaki Iida, Toyota (JP); Hiroyuki Katayama, Toyota (JP); Shintaro Takayama, Toyota (JP); Toyohiro Hayashi, Kariya (JP); Takeshi Iwana, Kariya (JP); Hayaki Tanabe, Kariya (JP); Nobuyori Nakajima, Kariya (JP); Hiroki Tomizawa, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 7 days.

(21) Appl. No.: 18/339,700

(22) Filed: Jun. 22, 2023

(65) Prior Publication Data
US 2023/0415586 A1 Dec. 28, 2023

(30) Foreign Application Priority Data
Jun. 24, 2022 (JP) .................... 2022-101931

(51) Int. Cl.
*B60L 50/61* (2019.01)
*B60W 10/08* (2006.01)
*B60W 10/26* (2006.01)

(52) U.S. Cl.
CPC ............. *B60L 50/61* (2019.02); *B60W 10/08* (2013.01); *B60W 10/26* (2013.01)

(58) Field of Classification Search
CPC ....... B60L 50/61; B60W 10/08; B60W 10/26; B60R 16/03; B60R 16/023
See application file for complete search history.

(56) References Cited

U.S. PATENT DOCUMENTS

| 7,260,457 B2 * | 8/2007 | Ma .......................... H02J 9/061 180/443 |
| 10,752,127 B1 * | 8/2020 | Miyake ............... H01M 10/425 |
| 2019/0252909 A1 | 8/2019 | Sugiyama |

FOREIGN PATENT DOCUMENTS

| EP | 4008606 A2 | 6/2022 |
| JP | 2019-140883 A | 8/2019 |

OTHER PUBLICATIONS

Feb. 26, 2024 Search Report issued in European Patent Application No. 23180223.2.

* cited by examiner

*Primary Examiner* — Jeffrey M Shin
(74) *Attorney, Agent, or Firm* — Oliff PLC

(57) ABSTRACT

A power supply device includes a driving control device and an auxiliary control device, the vehicle including a main power source, an auxiliary power source, and a supply path, the supply path being a path configured to be opened and closed according to a state of a start switch of the vehicle. The driving control device is a device that controls a state of equipment installed in the vehicle and the auxiliary control device is a device that controls a state of the auxiliary power (Continued)

source. The driving control device is configured to execute a storage process, a permission signal transmission process, and an initial value process, and the auxiliary control device is configured to execute a permission signal reception process and a stop process.

6 Claims, 5 Drawing Sheets

POWER SUPPLY DEVICE

CROSS-REFERENCE TO RELATED APPLICATION

This application claims priority to Japanese Patent Application No. 2022-101931 filed on Jun. 24, 2022, incorporated herein by reference in its entirety.

BACKGROUND

1. Technical Field

The present disclosure relates to a power supply device.

2. Description of Related Art

For example, Japanese Unexamined Patent Application Publication No. 2019-140883 describes a system in which an auxiliary power source is connected to an EPS-ECU that is a control device that executes control of applying an assistive torque to turning wheels. In this system, the auxiliary power source is controlled by a power source control ECU. Further, in this system, the power source control ECU and the EPS-ECU can communicate with each other.

SUMMARY

In the case where a result of communication with the EPS-ECU is added to conditions for the power source control ECU to turn the auxiliary power source off, a correct communication result may fail to be obtained, for example, immediately after start-up of the EPS-ECU.

In the following, measures that can solve this problem and their effects and advantages will be described. 1. A power supply device according to an aspect of the present disclosure includes a driving control device and an auxiliary control device that are installed in a vehicle. The vehicle includes a main power source, an auxiliary power source, and a supply path. The auxiliary power source is a power source that stores electricity supplied from the main power source. The supply path is a path that supplies electricity from the main power source to electronic equipment inside the vehicle and configured to be opened and closed according to a state of a start switch of the vehicle. The driving control device is a device that controls a state of equipment installed in the vehicle while using either the main power source or the auxiliary power source as a power source. The auxiliary control device is a device that controls a state of the auxiliary power source. The driving control device is configured to execute a storage process, a permission signal transmission process, and an initial value process. The storage process is a process of storing, in a storage device, a state of the start switch determined based on a signal from the outside of the driving control device. The permission signal transmission process is a process of transmitting a permission signal when the state of the start switch stored in the storage device is an off state. The initial value process is a process of, at start-up of the driving control device, setting an initial value of the state of the start switch stored in the storage device to a value indicating an on state. The auxiliary control device is configured to execute a permission signal reception process and a stop process. The permission signal reception process is a process of receiving the permission signal. The stop process is a process of putting control of supply of electricity from the auxiliary power source to the driving control device into an off state when the permission signal is received.

At start-up of the driving control device, the value stored in the storage device is normally initialized. When a value indicating an off state is thereby set as the state of the start switch, a permission signal may be transmitted from the driving control device to the auxiliary control device. In this case, the control of supply of electricity from the auxiliary power source to the driving control device may be put into an off state. If the main power source is cut off under these circumstances, electricity of the auxiliary power source may fail to be supplied to the driving control device when it should be supplied.

In the above-described configuration, therefore, at start-up of the driving control device, the initial value of the state of the start switch stored in the storage device is set to a value indicating an on state by the initial value process. This helps prevent a permission signal from being accidentally transmitted from the driving control device to the auxiliary control device. This in turn helps prevent the situation where electricity of the auxiliary power source fails to be supplied to the driving control device when it should be supplied.

2. In the power supply device according to the above-described aspect, the power supply device may be configured to start the storage process when communication between the driving control device and the outside becomes possible. In this configuration, the storage process is started when communication between the driving control device and the outside becomes possible. Thus, the state of the start switch stored in the storage device can be updated.

3. In the power supply device according to the above-described aspect, the auxiliary control device may be configured to execute a voltage transmission process, the driving control device may be configured to execute a voltage reception process and an off determination process, the voltage transmission process may be a process of transmitting a detected value of a voltage of the main power source, the voltage reception process may be a process of receiving the detected value, the off determination process may be a process of determining that the start switch is in an off state based on the detected value being equal to or smaller than a threshold value, and the storage process may be a process of storing a determination result of the off determination process. In this configuration, the driving control device can determine whether the start switch is in the off state according to the detected value of the voltage of the main power source.

4. In the power supply device according to the above-described aspect, the driving control device may be configured to execute a voltage detection process, the voltage detection process may be a process in which the driving control device detects a power source voltage of the driving control device, and the off determination process may be a process of determining that the start switch is in an off state based on a logical sum of the following conditions being true: that the power source voltage detected by the voltage detection process is equal to or lower than a predetermined value; and that the detected value is equal to or smaller than the threshold value. In this configuration, the state of the start switch can be determined with the power source voltage detected by the driving control device taken into account.

5. In the power supply device according to the above-described aspect, the power source voltage may be a voltage of the main power source or a voltage of the auxiliary power source, whichever is higher.

In this configuration, the driving control device detects a higher one of the voltages. Thus, even when the main power source is experiencing an abnormality, the abnormality of the main power source may fail to be detected by the detected voltage. Therefore, it is particularly advantageous to use the detected value of the voltage of the main power source transmitted from the auxiliary control device in the off determination process.

6. In the power supply device according to the above-described aspect, the off determination process may be a process of determining that the start switch is off based on a further condition that a command signal for putting the start switch into an off state is received, and the command signal may be not transmitted to a communication line leading to the auxiliary control device.

In this configuration, it is determined that the start switch is in the off state with the command signal taken into account, which can increase the reliability of the start switch being in the off state compared with when the command signal is not taken into account. Since the auxiliary control device cannot receive the command signal in this configuration, it is particularly advantageous that the driving control device executes the off determination process.

7. In the power supply device according to the above-described aspect, the vehicle may include a reaction force actuator that applies a reaction force to a steering wheel, and a turning actuator that turns turning wheels, the driving control device may include a steering control device and a turning control device, the steering control device may be a device that controls a state of the steering wheel by operating a driving circuit of the reaction force actuator, the turning control device may be a device that controls a state of the turning wheels by operating a driving circuit of the turning actuator, the off determination process may include a steering-side determination process and a turning-side determination process, the steering-side determination process being a process, executed by the steering control device, of determining whether the detected value is equal to or smaller than the threshold value, the turning-side determination process being a process, executed by the turning control device, of determining whether a logical sum of the following conditions is true: that the power source voltage detected by the voltage detection process is equal to or lower than the predetermined value; and that the detected value is determined to be equal to or smaller than the threshold value by the steering-side determination process, the steering control device may be configured to execute, in addition to the permission signal transmission process, a steering-side determination result transmission process and a turning-side determination result reception process, the turning control device may be configured to execute, in addition to the storage process, the initial value process, and the voltage detection process, a steering-side determination result reception process and a turning-side determination result transmission process, the steering-side determination result transmission process may be a process of transmitting a determination result of the steering-side determination process, the steering-side determination result reception process may be a process of receiving the determination result of the steering-side determination process, the storage process may be a process of storing a determination result of the turning-side determination process, the turning-side determination result transmission process may be a process of transmitting a determination result of the state of the start switch stored in the storage device, and the turning-side determination result reception process may be a process of receiving the determination result of the state of the start switch stored in the storage device.

In this configuration, in the case where the initial value process is not executed, a delay in either execution of the voltage transmission process by the auxiliary control device or execution of the steering-side determination result transmission process by the steering control device may lead to the following situation. Information that the state of the start switch stored in the storage device is the off state is transmitted to the steering control device by the turning-side determination result transmission process. As a result, a permission signal is transmitted from the steering control device to the auxiliary control device.

As a countermeasure, executing the initial value process helps prevent the occurrence of this series of events.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment will be described below with reference to the drawings.

Prerequisite Configuration

Figure 1:
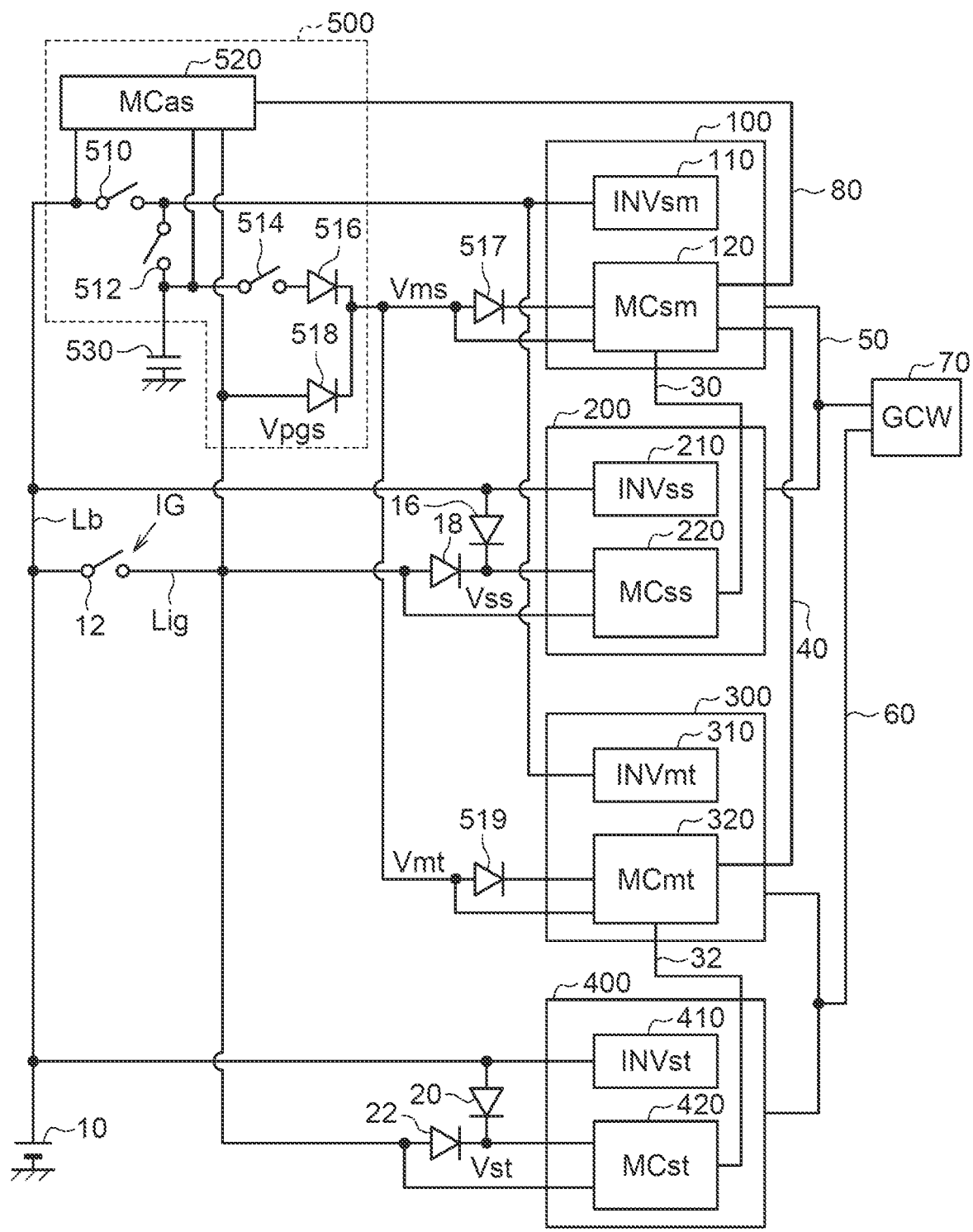
FIG. 1 is a block diagram showing the configuration of a steering control system of a vehicle according to one embodiment.

FIG. 1 shows the configuration of a steering control system of a vehicle according to the embodiment. This embodiment assumes, as a steering system, a so-called steer-by-wire system in which a power transmission path between a steering wheel and turning wheels is cut off.

A battery 10 is a supply source of electricity to electronic equipment of the vehicle. The battery 10 can supply electricity through a main power source line Lb as well as can supply electricity through a start switch 12 and a start line Lig. The start switch 12 is a switch that allows the vehicle to travel. The start switch 12 is switched from one to the other of an on state and an off state by operation of a user of the vehicle. When the vehicle includes an internal combustion engine, the start switch 12 may be an ignition switch. When the vehicle includes a motor-generator, the start switch 12 may be a switch that operates in conjunction with turning on and off of a system main relay between an inverter connected to the motor-generator and a high-voltage battery.

A steering main control device 100 is a device that controls the state of the steering wheel by operating a reaction force actuator. The reaction force actuator is an actuator that applies a reaction force that is a force resisting operation of the steering wheel. The reaction force actuator includes a reaction force motor, and a reaction force is generated by a torque of the reaction force motor.

The steering main control device 100 includes an inverter 110 and a steering main microcomputer 120. The inverter 110 applies an alternating-current voltage to terminals of a motor included in the reaction force actuator. The steering main microcomputer 120 operates the inverter 110 so as to control the steering wheel as a control target.

A steering sub control device 200 is a device that controls the state of the steering wheel by operating the reaction force actuator. The reaction force actuator is an actuator that applies a reaction force that is a force resisting operation of the steering wheel.

The steering sub control device 200 includes an inverter 210 and a steering sub microcomputer 220. The inverter 210 applies an alternating-current voltage to terminals of a motor included in the reaction force actuator. A configuration may be adopted in which the inverter 110 and the inverter 210 apply an alternating-current voltage to different stator coils of the reaction force motor that share a rotor. The steering sub microcomputer 220 operates the inverter 210 so as to control the steering wheel as a control target. A voltage in the start line Lig is applied to the steering sub microcomputer 220 through a diode 18. The diode 18 has an anode side on the side of the battery 10 and a cathode side on the side of the steering sub microcomputer 220. A terminal voltage of the battery 10 is applied to the steering sub microcomputer 220 through a diode 16, without the start switch 12 being interposed. The diode 16 has an anode side on the side of the battery 10 and a cathode side on the side of the steering sub microcomputer 220.

A turning main control device 300 is a device that controls the state of turning wheels by operating a turning actuator. The turning actuator is an actuator that turns the turning wheels. The turning actuator includes a turning motor and turns the turning wheels by a torque of the turning motor.

The turning main control device 300 includes an inverter 310 and a turning main microcomputer 320. The inverter 310 applies an alternating-current voltage to terminals of a motor included in the turning actuator. The turning main microcomputer 320 operates the inverter 310 so as to control the turning wheels as a control target.

A turning sub control device 400 is a device that controls the state of the turning wheels by operating the turning actuator. The turning sub control device 400 includes an inverter 410 and a turning sub microcomputer 420. The inverter 410 applies an alternating-current voltage to terminals of a motor included in the turning actuator. A configuration may be adopted in which the inverter 310 and the inverter 410 apply an alternating-current voltage to different stator coils of the turning motor that share a rotor. The turning sub microcomputer 420 operates the inverter 410 so as to control the turning wheels as a control target. A voltage in the start line Lig is applied to the turning sub microcomputer 420 through a diode 22. The diode 22 has an anode side on the side of the battery 10 and a cathode side on the side of the turning sub microcomputer 420. A terminal voltage of the battery 10 is applied to the turning sub microcomputer 420 through a diode 20, without the start switch 12 being interposed. The diode 20 has an anode side on the side of the battery 10 and a cathode side on the side of the turning sub microcomputer 420.

An auxiliary control device 500 is a device that controls the state of an auxiliary power source 530 as a control target. The auxiliary power source 530 is an electricity storage device that stores electric charge from the battery 10. The auxiliary power source 530 may be, for example, a capacitor. The auxiliary control device 500 may use the main power source as a power source.

The auxiliary control device 500 includes a switching element 510 that opens and closes a path between the main power source line Lb and the inverters 110, 310. The auxiliary control device 500 includes a switching element 512 that opens and closes a path between the main power source line Lb and the auxiliary power source 530 through the switching element 510. The auxiliary control device 500 includes a diode 516 that connects the auxiliary power source 530 on one side and the steering main microcomputer 120 and the turning main microcomputer 320 on the other side to each other. The diode 516 is a rectifier element that has an anode on the side of a positive electrode terminal of the auxiliary power source 530 and a cathode on the side of the steering main microcomputer 120 and the turning main microcomputer 320. The auxiliary control device 500 includes a diode 518 that connects the start line Lig on one side and the steering main microcomputer 120 and the turning main microcomputer 320 on the other side to each other. The diode 518 is a rectifier element that has an anode on the side of the battery 10 and a cathode on the side of the steering main microcomputer 120 and the turning main microcomputer 320. Specifically, the steering main microcomputer 120 is connected to the cathode sides of the diodes 516, 518 through a diode 517. The diode 517 is a rectifier element that has an anode side on the cathode sides of the diodes 516, 518 and a cathode side on the side of the steering main microcomputer 120. The turning main microcomputer 320 is connected to the cathode sides of the diodes 516, 518 through a diode 519. The diode 519 is a rectifier element that has an anode side on the cathode sides of the diodes 516, 518 and a cathode side on the side of the turning main microcomputer 320. The auxiliary control device 500 includes a switching element 514 that opens and closes a path between the anode side of the diode 516 and the auxiliary power source 530.

The auxiliary control device 500 includes an auxiliary microcomputer 520. The auxiliary microcomputer 520 detects a voltage and a current of the auxiliary power source 530 and monitors the state of the auxiliary power source 530. The auxiliary microcomputer 520 controls supply of electricity from the battery 10 to the inverters 110, 310 by opening and closing the switching element 510. The auxiliary microcomputer 520 controls exchange of electricity between the auxiliary power source 530 and the battery 10 and exchange of electricity between the inverters 110, 310 and the auxiliary power source 530 by opening and closing the switching element 512. The auxiliary microcomputer 520 controls supply of electricity from the auxiliary power source 530 to the steering main microcomputer 120 and the turning main microcomputer 320 by opening and closing the switching element 514. The auxiliary microcomputer 520 maintains the switching element 514 in a closed state during a period when the auxiliary microcomputer 520 is running.

The steering main microcomputer 120 and the steering sub microcomputer 220 can communicate with each other through a local line 30. The turning main microcomputer 320 and the turning sub microcomputer 420 can communicate with each other through a local line 32. The steering main microcomputer 120 and the turning main microcomputer 320 can communicate with each other through an inter-main communication line 40. The steering main microcomputer 120 and the steering sub microcomputer 220 are connected to a gateway 70 through a bus line 50. The turning main microcomputer 320 and the turning sub microcomputer 420 are connected to the gateway 70 through a bus line 60. The auxiliary microcomputer 520 and the steering main microcomputer 120 can communicate with each other through a local line 80.

Figure 2:
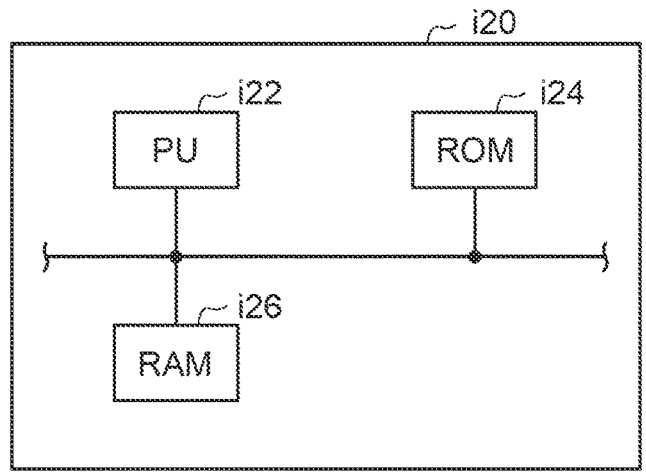
FIG. 2 is a block diagram showing the configurations of control devices according to the embodiment.

FIG. 2 shows the configurations of the steering main microcomputer 120, the steering sub microcomputer 220, the turning main microcomputer 320, the turning sub microcomputer 420, and the auxiliary microcomputer 520. In FIG. 2, variable i is "1 to 5" (i=1 to 5). That is, when the variable i is "1," "i20" indicates "120."

As shown in the drawing, the aforementioned five microcomputers include PUs 122, 222, 322, 422, 522, respectively. The aforementioned five microcomputers include ROMs 124, 224, 324, 424, 524, respectively. The aforementioned five microcomputers include RAMs 126, 226, 326, 426, 526, respectively. The PUs 122, 222, 322, 422, 522 are software processing devices including at least one processing unit, such as a CPU, GPU, or TPU. The ROMs 124, 224, 324, 424, 524 store programs that the PUs 122, 222, 322, 422, 522 execute.

Control of Sub Systems

Figure 3:
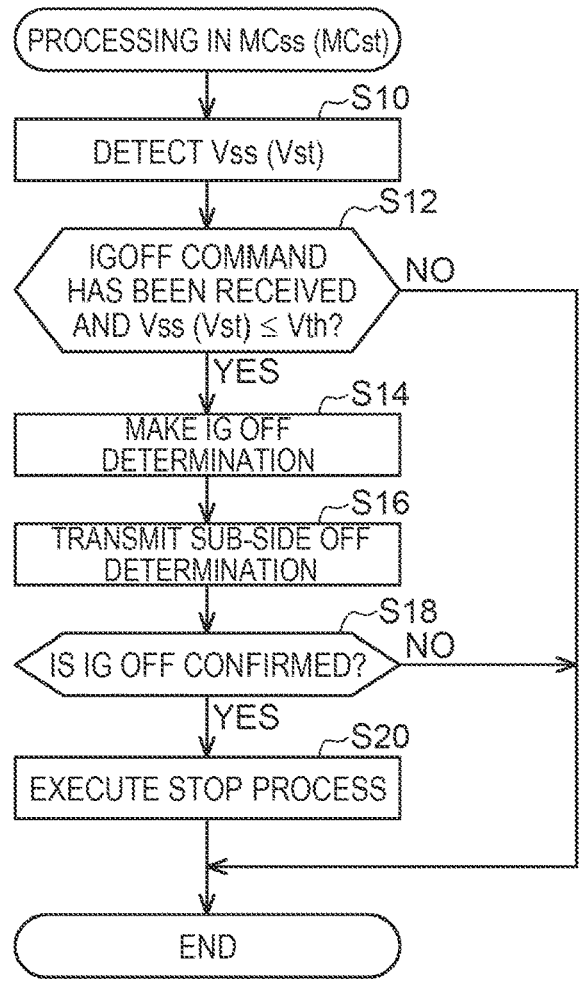
FIG. 3 is a flowchart showing the procedure of processing executed by control devices according to the embodiment.

FIG. 3 shows the procedure of processing executed by the PU 222 of the steering sub microcomputer 220 and the PU 422 of the turning sub microcomputer 420. The processing shown in FIG. 3 is processing that is realized as the PU 222 executes a program stored in the ROM 224 repeatedly, for example, on a predetermined cycle. Further, the processing shown in FIG. 3 is processing that is realized as the PU 422 executes a program stored in the ROM 424 repeatedly, for example, on a predetermined cycle. In the following, the step number of each process will be represented by a number given an "S" at the beginning. For the convenience of description, the processing executed by the PU 222 will be described as an example below. The processing executed by the PU 422 is one for which a voltage Vss is read as a voltage Vst in the following description.

In the series of processes shown in FIG. 3, the PU 222 first detects the voltage Vss (S10). The voltage Vss is a voltage in the start line Lig connected to the steering sub control device 200. That is, the voltage Vss is a voltage on the anode side of the diode 18. On the other hand, the voltage Vst is a voltage in the start line Lig connected to the turning sub control device 400. That is, the voltage Vst is a voltage on the anode side of the diode 22. Next, the PU 222 determines whether the logical product of the following Condition (SS1) and Condition (SS2) is true (S12).

Condition (SS1): a condition that a command signal for turning the start switch off has been received. In FIG. 3, this is indicated as "IGOFF COMMAND HAS BEEN RECEIVED." This command signal is input into the steering sub microcomputer 220 through the bus line 50. The command signal may be a signal that is generated by, for example, another control device that is not shown in FIG. 1.

Condition (SS2): a condition that the voltage Vss is equal to or lower than a threshold value Vth. Here, the threshold value Vth may be set to be smaller than a maximum value of a voltage that the start line Lig can assume when the start switch 12 is in an open state.

When the PU 222 determines that the above-described logical product is true (S12: YES), the PU 222 makes an IG off determination that is a determination that the start switch is off (S14). Then, the PU 222 transmits a sub-side off determination that is a determination result that the start switch is off to the steering main microcomputer 120 through the local line 30 (S16). Then, the PU 222 determines whether it is confirmed that the start switch is in the off state (IG off) (S18). Here, the PU 222 determines that IG off is confirmed on the condition, for example, that information that the steering main microcomputer 120 has determined that the start switch is off is transmitted from the steering main microcomputer 120 through the local line 30. When the PU 222 determines that the IG off is confirmed (S18: YES), the PU 222 executes a process of stopping the steering sub microcomputer 220 (S20).

In the case where the PU 222 executes the process of S20 and the case where the PU 222 determines in the negative in the processes of S12 and S18, the PU 222 temporarily ends the series of processes shown in FIG. 3.

Control of Steering Main Microcomputer

Figure 4:
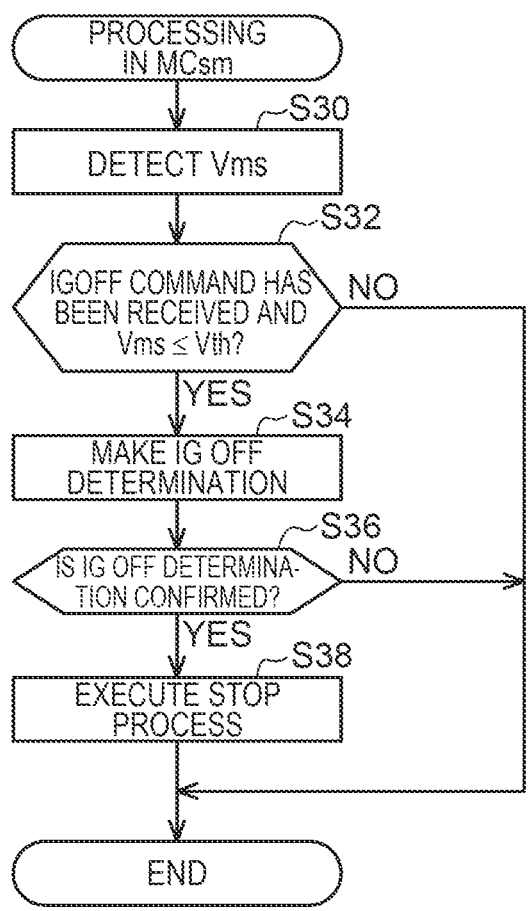
FIG. 4 is a flowchart showing the procedure of processing executed by a control device according to the embodiment.

FIG. 4 shows the procedure of processing executed by the PU 122 of the steering main microcomputer 120. The processing shown in FIG. 4 is processing that is realized as the PU 122 executes a program stored in the ROM 124 repeatedly, for example, on a predetermined cycle.

In the series of processes shown in FIG. 4, the PU 122 first detects a voltage Vms on the cathode sides of the diodes 516, 518 (S30). The voltage Vms is a voltage on the anode side of the diode 517. Next, the PU 122 determines whether the logical product of the following Condition (MS1) and Condition (MS2) is true (S32).

Condition (MS1): a condition that a command signal for turning the start switch off has been received. In FIG. 4, this is indicated as "IGOFF COMMAND HAS BEEN RECEIVED." This command signal is input into the steering main microcomputer 120 through the bus line 50. The command signal may be a signal that is generated by, for example, another control device that is not shown in FIG. 1.

Condition (MS2): a condition that the voltage Vms is equal to or lower than a threshold value Vth. When the PU 122 determines that the above-described logical product is true (S32: YES), the PU 122 makes an IG off determination that is a determination that the start switch is off (S34). Then, the PU 122 determines whether the determination that the start switch is in the off state (IG off determination) is confirmed (S36). The PU 122 confirms the determination that the start switch is in the off state on the condition, for example, that it is determined that a sub-side off determination has been transmitted. Then, the PU 122 executes a process of stopping the steering main microcomputer 120 (S38).

In the case where the PU 222 executes the stop process of S38 and the case where the PU 222 determines in the negative in the processes of S32 and S36, the PU 222 temporarily ends the series of processes shown in FIG. 4.

Processing in Auxiliary Microcomputer 520, Steering Main Microcomputer 120, and Turning Main Microcomputer 320

Figure 5:
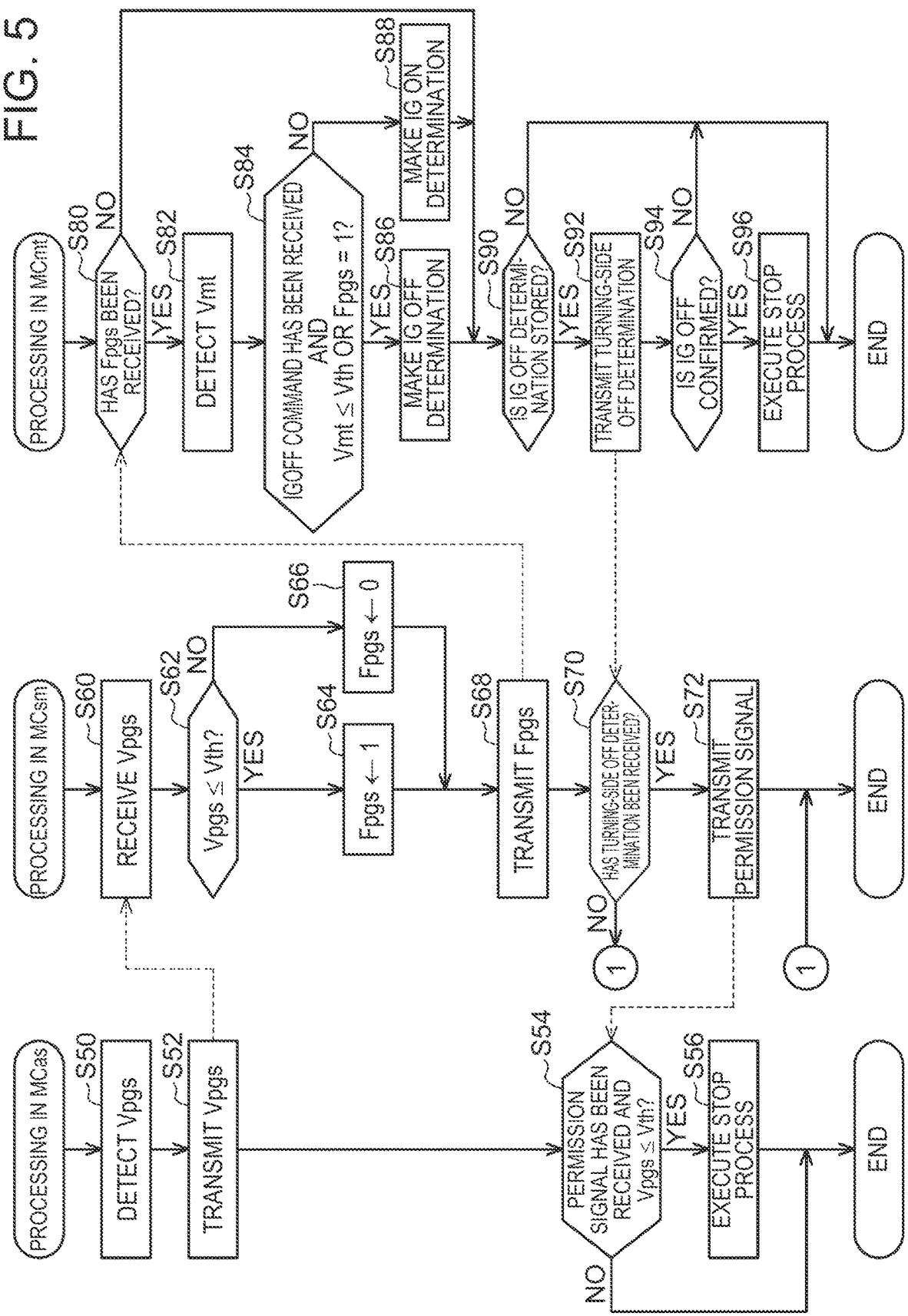
FIG. 5 is a flowchart showing the procedures of processing executed by control devices according to the embodiment.

FIG. 5 shows the procedures of processing executed by the auxiliary microcomputer 520, the steering main microcomputer 120, and the turning main microcomputer 320. One of the three series of processes shown in FIG. 5 is realized as the PU 522 executes a program stored in the ROM 524 repeatedly, for example, on a predetermined cycle. Another one of the three series of processes shown in FIG. 5 is realized as the PU 122 executes a program stored in the ROM 124 repeatedly, for example, on a predetermined cycle. The remaining one of the three series of processes shown in FIG. 5 is realized as the PU 322 executes a program stored in the ROM 324 repeatedly, for example, on a predetermined cycle. In the following, the series of processes shown in FIG. 5 will be described in chronological order in which these processes can actually occur.

In the series of processes shown in FIG. 5, the PU 522 first detects a voltage Vpgs in the start line Lig connected to the auxiliary control device 500 (S50). The voltage Vpgs is a voltage on the anode side of the diode 518. Next, the PU 522 transmits the voltage Vpgs to the steering main microcomputer 120 through the local line 80 (S52).

Meanwhile, the PU 122 of the steering main microcomputer 120 receives the voltage Vpgs (S60). Then, the PU 122 determines whether the voltage Vpgs is equal to or lower than the threshold value Vth (S62). This process is a process of determining whether the start switch 12 is in the off state. When the PU 122 determines that the voltage Vpgs is equal to or lower than the threshold value Vth (S62: YES), the PU 122 substitutes "1" to a determination flag Fpgs (S64). On the other hand, when the PU 122 determines that the voltage Vpgs is higher than the threshold value Vth (S62: NO), the PU 122 substitutes "0" to the determination flag Fpgs (S66). In the case where the PU 122 completes the process of S64 or S66, the PU 122 transmits the value of the determination flag Fpgs to the turning main microcomputer 320 through the inter-main communication line 40 (S68).

Meanwhile, the PU 322 of the turning main microcomputer 320 determines whether the value of the determination flag Fpgs has been received (S80). When the PU 322 determines that the value has been received (S80: YES), the PU 322 detects a voltage Vmt on the cathode sides of the diodes 516, 518 (S82). The voltage Vmt is a voltage on the anode side of the diode 519. Next, the PU 422 determines whether the logical product of the following Condition (MT1), and a condition that the logical sum of the following Condition (MT2) and Condition (MT3) is true, is true (S84).

Condition (MT1): a condition that a command signal for turning the start switch off has been received. In FIG. 5, this is indicated as "IGOFF COMMAND HAS BEEN RECEIVED." This command signal is input into the turning main microcomputer 320 through the bus line 60. The command signal may be a signal that is generated by, for example, another control device that is not shown in FIG. 1.

Condition (MT2): a condition that the voltage Vmt is equal to or lower than the threshold value Vth. Condition (MT3): a condition that the determination flag Fpgs is "1." When the PU 322 determines that the logical product is true (S84: YES), the PU 322 determines that the start switch is off (IG off determination) and stores that information in the RAM 326 (S86). On the other hand, when the PU 322 determines in the negative in the process of S84, the PU 322 determines that the start switch is in the on state and stores that information in the RAM 326 (S88).

In the case where the PU 322 completes the process of S86 or S88 and the case where the PU 322 determines in the negative in the process of S80, the PU 322 determines whether the determination result of the start switch being off is stored in the RAM 326 (S90). When the PU 322 determines that the off determination result is stored (S90: YES), the PU 322 transmits information that an IG off determination (turning-side off determination) has been made on the side of the turning main microcomputer 320 through the inter-main communication line 40 (S92).

Meanwhile, the PU 122 of the steering main microcomputer 120 determines whether the determination result that the start switch is off transmitted from the turning main microcomputer 320 has been received (S70). When the PU 122 determines that the determination result has been received (S70: YES), the PU 122 transmits a permission signal that permits the auxiliary microcomputer 520 to be turned off through the local line 80 (S72). In the case where the PU 122 completes the process of S72 and the case where the PU 122 determines in the negative in the process of S70, the PU 122 temporarily ends the series of processes shown in FIG. 5.

Meanwhile, the PU 522 of the auxiliary microcomputer 520 determines whether the logical product of the following Condition (AS1) and Condition (AS2) is true (S54). Condition (AS1): a condition that the permission signal has been received.

Condition (AS2): a condition that the voltage Vpgs is equal to or lower than the threshold value Vth. When the PU 522 determines that the above-described logical product is true (S54: YES), the PU 522 executes a process of stopping the auxiliary microcomputer 520 (S56). The process of stopping the auxiliary microcomputer 520 includes a process in which the auxiliary microcomputer 520 opens the switching element 514. In the case where the PU 522 completes the process of S56 and the case where the PU 522 determines in the negative in the process of S54, the PU 522 temporarily ends the series of processes shown in FIG. 5.

On the other hand, in the case where the PU 322 of the turning main microcomputer 320 completes the process of S92, the PU 322 determines whether the off state of the start switch is confirmed (S94). Here, the PU 322 confirms the determination that the start switch is off when a condition is met such as that the determination result that the start switch is in the off state has been received from the turning sub microcomputer 420 by the process of S16 in FIG. 3. When the determination that the start switch is off is confirmed (S94: YES), the PU 322 puts the turning main microcomputer 320 into an off state (S96).

In the case where the PU 322 completes the process of S96 and the case where the PU 322 determines in the negative in the process of S90 or S94, the PU 322 temporarily ends the series of processes shown in FIG. 5.

Setting of Initial Value

Figure 6:
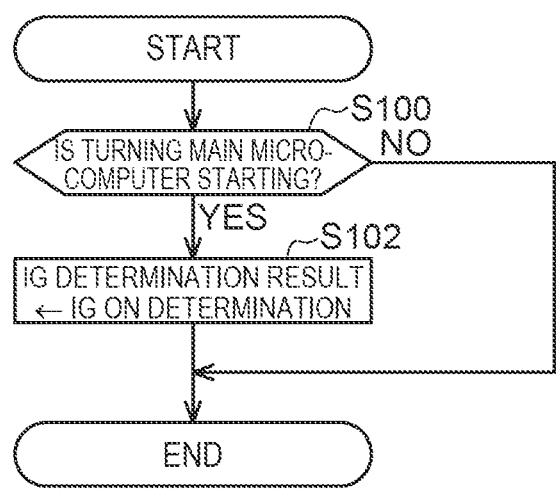
FIG. 6 is a flowchart showing the procedure of processing executed by a control device according to the embodiment.

FIG. 6 shows the procedure of processing relating to setting of an initial value in a part of a storage area of the RAM 326 where a determination result of the state of the start switch is stored. The processing shown in FIG. 6 is realized as the PU 322 executes a program stored in the ROM 324 repeatedly, for example, on a predetermined cycle.

In the series of processes shown in FIG. 6, the PU 322 first determines whether the turning main microcomputer 320 is starting (S100). When the PU 322 determines that the turning main microcomputer 320 is starting (S100: YES), the PU 322 sets the value in the part of the storage area of the RAM 326 where the determination result of the state of the start switch is stored to a determination result that the start switch is on (S102). In the case where the PU 322 completes the process of S102 and the case where the PU 322 determines in the negative in the process of S100, the PU 322 temporarily ends the series of processes shown in FIG. 6.

Here, effects and advantages of the embodiment will be described. When the PU 522 of the auxiliary microcomputer 520 detects the voltage Vpgs, the PU 522 transmits the voltage Vpgs to the steering main microcomputer 120 through the local line 80. The PU 122 of the steering main microcomputer 120 substitutes a comparison result of the voltage Vpgs and the threshold value Vth to the value of the determination flag Fpgs. Then, the PU 122 transmits the value of the determination flag Fpgs to the turning main microcomputer 320 through the inter-main communication line 40. The PU 322 of the turning main microcomputer 320 determines that the start switch is in the off state when the logical sum of the condition that the value of the determination flag Fpgs is "1" and the condition that the voltage Vmt is equal to or lower than the threshold value Vth is true and moreover the IG off command has been received. Then, the PU 322 stores the determination result in the RAM 326. When the determination result stored in the RAM 326 is a determination result that the start switch is in the off state, the PU 322 transmits that information to the steering main microcomputer 120 through the inter-main communication line 40. When the steering main microcomputer 120 receives the determination result that the start switch is in the off state from the turning main microcomputer 320, the steering main microcomputer 120 transmits a permission signal to the auxiliary microcomputer 520. The PU 522 of the auxiliary microcomputer 520 puts the auxiliary microcomputer 520 into the off state on the condition that the permission signal is received.

In this way, by using the voltage Vpgs detected in the auxiliary control device 500, the PU 122 of the steering main microcomputer 120 can determine the state of the start switch based on the voltage Vpgs in the start line Lig. That is, the voltage on the cathode sides of the diodes 516, 518 is applied to the steering main microcomputer 120 and the turning main microcomputer 320. Therefore, in the case where the start switch 12 is in the off state, when the voltage in the start line Lig decreases, a terminal voltage of the auxiliary power source 530 is applied to the steering main microcomputer 120 and the turning main microcomputer 320. Thus, the steering main microcomputer 120 and the turning main microcomputer 320 cannot directly detect the voltage in the start line Lig.

At start-up when the start switch 12 switches from the open state to the closed state, the steering main microcomputer 120, the turning main microcomputer 320, and the auxiliary microcomputer 520 can vary from one another in start-up timing. For this reason, it sometimes takes time until communication between the steering main microcomputer 120 and the auxiliary microcomputer 520 is established and communication between the steering main microcomputer 120 and the turning main microcomputer 320 is established. On the other hand, microcomputers generally initialize stored data at start-up. When the value indicating the state of the start switch stored in the RAM 326 is set to a value indicating an off state as a result of initialization, due to a delay in establishing communication etc., a determination result of an off state is transmitted from the PU 322 to the steering main microcomputer 120. As a result, a permission signal is transmitted from the PU 122 to the auxiliary microcomputer 520, so that the PU 522 stops the auxiliary microcomputer 520. That is, there is a concern that the auxiliary microcomputer 520 may stop accidentally at normal start-up when the start switch 12 is switched from the open state to the closed state. In this case, when supply of electricity from the battery 10 is interrupted thereafter due to breakage of the start line Lig etc., electricity of the auxiliary power source 530 that should be originally used becomes unavailable. This state may continue until the start switch 12 is closed again after it is temporarily opened.

As a countermeasure, in this embodiment, at start-up of the turning main microcomputer 320, the PU 322 switches the determination result of the state of the start switch to a determination result that the start switch is in the on state in the process of initializing the RAM 326. This helps prevent a permission signal from being accidentally transmitted to the auxiliary microcomputer 520 due to the aforementioned delay in communication etc.

The embodiment having been described above can further produce the following effects and advantages. (1) A communication line in which the gateway 70 is interposed is not provided in the communication line between the auxiliary control device 500 and the outside. Thus, the number of components of the steering control system can be reduced, and the cost can be reduced. In this case, however, the auxiliary microcomputer 520 cannot receive an off command for the start switch from the outside. In the case where the PU 522 of the auxiliary microcomputer 520 itself determines the state of the start switch from the voltage Vpgs alone, the reliability of the determination result is lower compared with when reception of the off command is taken into account. Therefore, it is particularly advantageous to generate a permission signal by determining the state of the start switch outside the auxiliary control device 500.

Correspondence Relationships

The correspondence relationships between items in the above-described embodiment and items described in the section "SUMMARY" are as follows. In the following, the correspondence relationships are shown according to the numbers of the solutions described in the section "SUMMARY" [1] The driving control device corresponds to the steering main control device 100 and the turning main control device 300. The auxiliary control device corresponds to the auxiliary control device 500. The main power source corresponds to the battery 10. The auxiliary power source corresponds to the auxiliary power source 530. The supply path corresponds to the start line Lig. The storage process corresponds to the processes of S86 and S88. The permission signal transmission process corresponds to the process of S72. The initial value process corresponds to the process of S102. The storage device corresponds to the RAM 326. The permission signal reception process corresponds to the process of S54. The stop process corresponds to the process of S56. [2] This solution corresponds to being able to execute the process of S86 or S88 after the value of the determination flag Fpgs is received in the process of S80. [3] The voltage transmission process corresponds to the process of S52. The voltage reception process corresponds to the process of S60. The off determination process corresponds to the processes of S62 to S66 and S84. [4] The voltage detection process corresponds to the process of S82. [5] This solution corresponds to the output voltages of the diodes 516, 518 being applied to the steering main microcomputer 120 and the turning main microcomputer 320. [6] This solution corresponds to the auxiliary control device 500 being connected to only the steering main control device 100 through the local line 80 in FIG. 1. [7] The driving circuit of the reaction force actuator corresponds to the inverter 110. The driving circuit of the turning actuator corresponds to the inverter 310. The steering-side determination process corresponds to the processes of S62 to S66. The turning-side determination process corresponds to the process of S84. The steering-side determination result transmission process corresponds to the process of S68. The steering-side determination result reception process corresponds to the process of S80. The turning-side determination result transmission process corresponds to the process of S92. The turning-side determination result reception process corresponds to the process of S70.

Other Embodiments

The embodiment can be implemented with the following changes made thereto. The embodiment and the following modified examples can be implemented in combination to such an extent that no technical inconsistency arises.

Turning-Side Determination Process
  The turning-side determination process is not limited to the process of S84. For example, Condition (MT1) may be omitted. In other words, this process may be a process of determining whether the logical sum of Condition (MT2) and Condition (MT3) is true. Further, for example, this process may be a process of determining whether the logical product of Condition (MT1) and Condition (MT3) is true.

Steering-Side Determination Process
  The steering-side determination process is not limited to the processes of S62 to S66. For example, this process may be a process of moving to S64 when the logical sum of the condition that the voltage Vpgs is equal to or lower than the threshold value Vth and the condition that the voltage Vms is equal to or lower than the threshold value Vth is true.

Process of Stopping Auxiliary Control Device
  The condition for executing the stop process is not limited to the condition that the logical product of Condition (AS1) and Condition (AS2) is true. For example, only Condition (AS1) may be used.

Communication Path
  For example, the inter-main communication line 40 between the steering main control device 100 and the turning main control device 300 may be a path in which the gateway 70 is interposed.
  It is not essential that the configuration is such that the target with which the auxiliary control device 500 communicates directly is only the steering main control device 100.

Control Devices that Operate Reaction Force Actuator
  The control devices that operate the reaction force actuator are not limited to the steering main control device 100 and the steering sub control device 200. For example, only the steering main control device 100 may control the reaction force actuator. Further, for example, cases where a plurality of control devices that operates the reaction force actuator is provided to create redundancy are not limited to a case where two control devices are provided. For example, three or more control devices that operate the reaction force actuator may be provided.

Control Devices that Operate Turning Actuator
  The control devices that operate the turning actuator are not limited to the turning main control device 300 and the turning sub control device 400. For example, only the turning main control device 300 may control the turning actuator. Further, for example, cases where a plurality of control devices that operates the turning actuator is provided to create redundancy are not limited to a case where two control devices are provided. For example, three or more control devices that operate the turning actuator may be provided.

Driving Control Devices
  It is not essential that the driving control devices include the steering main control device 100 and the turning main control device 300. For example, these control devices may be provided as one control device. In this case, a PU, a ROM, and a storage device can be shared. Further, for example, as described later in the section "Equipment Installed in Vehicle", in the case of a configuration in which the steering wheel is mechanically coupled to the turning wheels, the driving control device may be a device that operates an electric motor for assisting turning of the turning wheels.

The driving control device is not limited to the one that includes a PU and a ROM and executes software processing. For example, the driving control device may include a dedicated hardware circuit (e.g., an ASIC) that performs hardware processing of at least some of the processes that are processed by software in the above-described embodiment. Specifically, the driving control device may be one of the following configurations (a) to (c). (a) A configuration including a processing device that executes all of the above-described processes in accordance with a program, and a program storage device, such as a ROM, that stores the program. (b) A configuration including a processing device that executes some of the above-described processes in accordance with a program, a program storage device, and a dedicated hardware circuit that executes the other processes. (c) A configuration including a dedicated hardware circuit that executes all of the above-described processes. Here, a plurality of software processing circuits including processing devices and program storage devices or a plurality of dedicated hardware circuits may be provided. Thus, the above-described processes may be executed by a processing circuit that includes at least either one or more software processing circuits or one or more dedicated hardware circuits.

Auxiliary Control Device
  The auxiliary control device 500 is not limited to the one that includes the PU 522 and the ROM 524 and executes software processing. For example, the auxiliary control device may include a dedicated hardware circuit (e.g., an ASIC) that performs hardware processing of at least some of the processes that are processed by software in the above-described embodiment. Specifically, the auxiliary control device may have one of the following configurations (a) to (c). (a) A configuration including a processing device that executes all of the above-described processes in accordance with a program, and a program storage device, such as a ROM, that stores the program. (b) A configuration including a processing device that executes some of the above-described processes in accordance with a program, a program storage device, and a dedicated hardware circuit that executes the other processes. (c) A configuration including a dedicated hardware circuit that executes all of the above-described processes. Here, a plurality of software processing circuits including processing devices and program storage devices or a plurality of dedicated hardware circuits may be provided. Thus, the above-described processes may be executed by a processing circuit that includes at least either one or more software processing circuits or one or more dedicated hardware circuits.

Equipment Installed in Vehicle
  The equipment of which the state is controlled by the driving control device is not limited to the steering wheel and the turning wheels. For example, in the case of the configuration in which the steering wheel is mechanically coupled to the turning wheels, that equipment may be only the turning wheels.
  It is not essential that the equipment of which the state is controlled by the driving control device is equipment in the steering system of the vehicle.

What is claimed is:

1. A power supply device comprising a driving control device and an auxiliary control device that are installed in a vehicle,
the vehicle including a main power source, an auxiliary power source, and a supply path,
the auxiliary power source being a power source that stores electricity supplied from the main power source,
the supply path being a path that supplies electricity from the main power source to electronic equipment installed in the vehicle and being configured to be opened and closed according to a state of a start switch of the vehicle, wherein:
the driving control device controls a state of the electronic equipment installed in the vehicle while using either the main power source or the auxiliary power source as a power source;
the auxiliary control device controls a state of the auxiliary power source;
the driving control device is configured to execute a storage process, a permission signal transmission process, and an initial value process, the storage process being a process of storing, in a storage device, a state of the start switch determined based on a signal from an outside of the driving control device, the permission signal transmission process being a process of transmitting a permission signal when the state of the start switch stored in the storage device is an off state, the initial value process being a process of, at start-up of the driving control device, setting an initial value of the state of the start switch stored in the storage device to a value indicating an on state;
the auxiliary control device is configured to execute a permission signal reception process and a stop process, the permission signal reception process being a process of receiving the permission signal, the stop process being a process of putting control of supply of electricity from the auxiliary power source to the driving control device into an off state when the permission signal is received;
the auxiliary control device is configured to execute a voltage transmission process;
the driving control device is configured to execute a voltage reception process and an off determination process;
the voltage transmission process is a process of transmitting a detected value of a voltage of the main power source;
the voltage reception process is a process of receiving the detected value of the voltage of the main power source;
the off determination process is a process of determining that the start switch is in an off state based on the detected value of the voltage of the main power source being equal to or smaller than a threshold value; and
the storage process is a process of storing a determination result of the off determination process.

2. The power supply device according to claim 1, wherein the power supply device is configured to start the storage process when communication between the driving control device and the outside becomes possible.

3. The power supply device according to claim 1, wherein:
the driving control device is configured to execute a voltage detection process;
the voltage detection process is a process in which the driving control device detects a power source voltage of the driving control device; and
the off determination process is a process of determining that the start switch is in an off state based on a logical sum of following conditions being true: that the power source voltage detected by the voltage detection process is equal to or lower than a predetermined value; and that the detected value of the voltage of the main power source is equal to or smaller than the threshold value.

4. The power supply device according to claim 3, wherein the power source voltage is a voltage of the main power source or a voltage of the auxiliary power source, whichever is higher.

5. The power supply device according to claim 1, wherein the off determination process is a process of determining that the start switch is off based on a further condition that a command signal for putting the start switch into an off state is received, and the command signal is not transmitted to a communication line leading to the auxiliary control device.

6. The power supply device according to claim 3, wherein:
the vehicle includes a reaction force actuator that applies a reaction force to a steering wheel, and a turning actuator that turns turning wheels;
the driving control device includes a steering control device and a turning control device;
the steering control device controls a state of the steering wheel by operating a driving circuit of the reaction force actuator;
the turning control device controls a state of the turning wheels by operating a driving circuit of the turning actuator;
the off determination process includes a steering-side determination process and a turning-side determination process, the steering-side determination process being a process, executed by the steering control device, of determining whether the detected value of the voltage of the main power source is equal to or smaller than the threshold value, the turning-side determination process being a process, executed by the turning control device, of determining whether a logical sum of following conditions is true: that the power source voltage detected by the voltage detection process is equal to or lower than the predetermined value; and that the detected value of the voltage of the main power source is determined to be equal to or smaller than the threshold value by the steering-side determination process;
the steering control device is configured to execute, in addition to the permission signal transmission process, a steering-side determination result transmission process and a turning-side determination result reception process;
the turning control device is configured to execute, in addition to the storage process, the initial value process, and the voltage detection process, a steering-side determination result reception process and a turning-side determination result transmission process;
the steering-side determination result transmission process is a process of transmitting a determination result of the steering-side determination process;
the steering-side determination result reception process is a process of receiving the determination result of the steering-side determination process;
the storage process is a process of storing a determination result of the turning-side determination process;
the turning-side determination result transmission process is a process of transmitting a determination result of the state of the start switch stored in the storage device; and the turning-side determination result reception process is a process of receiving the determination result of the state of the start switch stored in the storage device.

* * * * *